US008488137B2

(12) United States Patent
Matsumoto et al.

(10) Patent No.: US 8,488,137 B2
(45) Date of Patent: Jul. 16, 2013

(54) IMAGE FORMING APPARATUS PROVIDED WITH POST-PROCESSING DEVICE

(75) Inventors: Yoshitaka Matsumoto, Osaka (JP); Masaru Tsuji, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 435 days.

(21) Appl. No.: 12/849,904

(22) Filed: Aug. 4, 2010

(65) Prior Publication Data

US 2011/0051167 A1 Mar. 3, 2011

(30) Foreign Application Priority Data

Aug. 31, 2009 (JP) ................................ 2009-199922

(51) Int. Cl.
*G06F 3/12* (2006.01)
*G03G 15/00* (2006.01)

(52) U.S. Cl.
USPC .......................... 358/1.13; 358/1.15; 399/407

(58) Field of Classification Search
None
See application file for complete search history.

(56) References Cited

U.S. PATENT DOCUMENTS

| | | | | |
|---|---|---|---|---|
| 8,078,093 | B2 * | 12/2011 | Sasaoka et al. | 399/405 |
| 2003/0044209 | A1 * | 3/2003 | Isobe et al. | 399/410 |
| 2004/0228650 | A1 * | 11/2004 | Saito | 399/107 |
| 2004/0246540 | A1 * | 12/2004 | Makino | 358/498 |
| 2005/0195451 | A1 * | 9/2005 | Sugano | 358/498 |
| 2006/0159501 | A1 * | 7/2006 | Matsutomo | 399/410 |
| 2006/0222380 | A1 * | 10/2006 | Shimazawa et al. | 399/18 |
| 2009/0074495 | A1 * | 3/2009 | Shiraki et al. | 399/407 |

FOREIGN PATENT DOCUMENTS

| | | | |
|---|---|---|---|
| JP | 01-294155 | A | 11/1989 |
| JP | 08-339107 | A | 12/1996 |
| JP | 2008-268785 | A | 11/2008 |

* cited by examiner

*Primary Examiner* — Ming Hon

(74) *Attorney, Agent, or Firm* — Renner, Otto, Boisselle & Sklar, LLP

(57) ABSTRACT

An image forming apparatus comprises a main body, a post-processing device, an objective working section, a light source and a shade member. The post-processing device is disposed freely displaceable between a retracted position at which it is received by an intra-body paper discharge section of the main body and a protruded position at which it is drawn to one side face side. The objective working section is disposed on an upstream side face of the post-processing device in the drawing direction of the post-processing device.

The light source is disposed on the upstream side face of the post-processing device, and lights up the objective working section at the protruded position. The shade member is disposed on the upstream side face of the post-processing device and in the front face side from the light source, and blocks direct projection light of the light source to the front face side.

7 Claims, 9 Drawing Sheets

IMAGE FORMING APPARATUS PROVIDED WITH POST-PROCESSING DEVICE

CROSS REFERENCE

This Nonprovisional application claims priority under 35 U.S.C. §119(a) on Patent Application No. 2009-199922 filed in Japan on Aug. 31, 2009, the entire contents of which are hereby incorporated by reference.

BACKGROUND OF THE INVENTION

The present invention relates to an image forming apparatus comprising a post-processing device that is disposed so as to be freely displaceable between the retracted position and protruded position thereof at an intra-body paper discharge section which is sandwiched between upside and downside by an image reading section and an image forming section respectively.

In recent years, as demand for a smaller-sized image forming apparatus has increased, what is called intra-body paper discharge models of image forming apparatus have been used, wherein recording media having undergone an image forming process are discharged to a paper discharge section that is disposed inside the body and sandwiched between upside and downside by an image reading section and an image forming section respectively. Among such intra-body paper discharge models of image forming apparatus are those which comprise a post-processing device at the intra-body paper discharge section and apply a post-process such as binding process and/or perforating process to the recording media that have undergone the image forming process.

The intra-body paper discharge section, because the top face and undersurface thereof is surrounded by the image reading section and the image forming section, and part of the side face thereof is also surrounded by a support member supporting the image reading section and the image forming section, is therefore darker compared with outside. On this account, there have been problems associated with difficulties in dealing with tasks such as retrieval of recording media at the intra-body paper discharge section, and/or maintenance tasks to the post-processing device, etc.

So, as described in Japanese Patent Unexamined Publication No. 1-294155 bulletin, for example, an image forming apparatus comprising a light source for lighting up the recording medium discharged to an intra-body paper discharge section has been proposed.

However, in the conventional image forming apparatus as mentioned in the patent literature, since the light source has been disposed far back in the intra-body paper discharge section, lighting up a wide range of the intra-body paper discharge section with direct projection light emitted therefrom, it has been most likely for a user to see the direct projection light from the light source. Sight of such direct projection light would dazzle the user, and then rather be likely to hinder the user's workability.

SUMMARY OF THE INVENTION

The present invention is directed to providing an image forming apparatus that is capable of providing improved workability at an intra-body paper discharge section by lighting up the intra-body paper discharge section with a light source, while preventing direct projection light of a light source from coming into a user's sight.

The image forming apparatus comprises a main body, a post-processing device, an objective working section, a light source and a shade member. The main body includes an intra-body paper discharge section that is provided in a space sandwiched between upside and downside respectively by an image reading section for reading the image of a document and generating a set of image data and an image forming section for performing an image forming process to a recording medium based on the set of image data; and the recording medium after having undergone the image forming process is discharged to the intra-body paper discharge section. The post-processing device is disposed freely displaceable between a retracted position at which it is received inside the intra-body paper discharge section and a protruded position at which it is drawn to one side face side; and at the retracted position it applies a process to a recording medium that has undergone an image forming process. The objective working section is disposed on an upstream side face of the post-processing device in the drawing direction of the post-processing device; and it is subjected to maintenance tasks at the protruded position. The light source is disposed on the upstream side face of the post-processing device, and performs a function of lighting up the objective working section at the protruded position. The shade member is disposed on the upstream side face of the post-processing device and in the front face side from the light source, and blocks the direct projection light to the front face side of the light source.

Because the objective working section is lit up in the intra-body paper discharge section by the light source, brightness of the objective working section increases, visibility improves, and then workability to the objective working section improves. On the other hand, because the shade member is disposed in the front face side from the light source, the direct projection light to the front side of the light source is blocked.

DETAILED DESCRIPTION OF THE INVENTION

An embodiment of the present invention is explained below based on the drawings.

Figure 1:
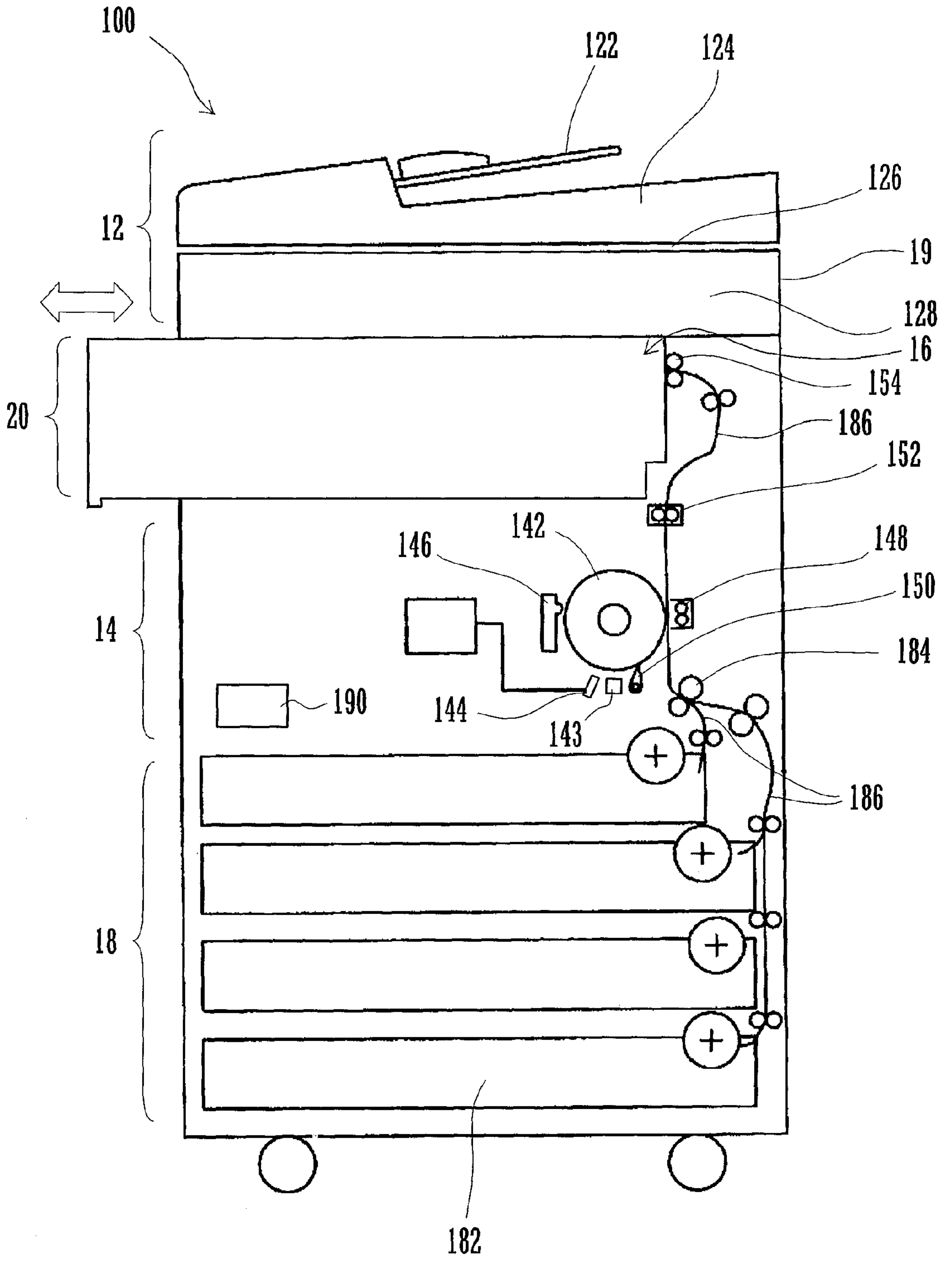
FIG. 1 is a schematic front sectional view of an image forming apparatus according to an embodiment of the present invention.

As shown in FIG. 1, an image forming apparatus 100 comprises: a main body 19 including an image reading section 12 for reading an image of a document and generating a set of image data, an image forming section 14 for performing an image forming process on paper, and a paper supply section 18 for supplying paper to the image forming section 14 sequentially; and a post-processing device 20 for performing a post-process on the paper as an example of a recording medium to which an image forming process has been applied at the image forming section 14. The image forming apparatus 100 is generally controlled by a control section 190.

An intra-body paper discharge section 16 is provided in a space sandwiched between upside and downside by the image reading section 12 and the image forming section 14 respectively.

The image reading section 12 comprises an optical system unit 128 configured so as to read the image of a document on a document table 126, and an automated document conveying unit 124 for sequentially conveying the document on a document loading table 122 to a document reading position of the document table 126.

The image forming section 14 is disposed under the image reading section 12. The image forming section 14 comprises a photoconductor drum 142 as an image carrying body disposed so as to abut a paper conveying path 186. Around the photoconductor drum 142 are disposed an electrostatic charge device 143, an exposure device 144, a developing device 146, a transfer device 148 and a cleaning unit 150. The electrostatic charge device 143 charges the photoconductor drum 142 uniformly to a predetermined electrostatic potential. The exposure device 144 forms an electrostatic latent image on the photoconductor drum 142 by exposing the photoconductor drum 142. The developing device 146 develops the electrostatic latent image on the photoconductor drum 142 to a developer image by supplying developer to the photoconductor drum 142. The transfer device 148 transfers the developer image on the photoconductor drum 142 onto paper. The cleaning unit 150 collects the developer and the like that have remained on the photoconductor drum 142.

The image forming section 14 further comprises a fuser 152 installed in the downstream side from the photoconductor drum 142 in the paper conveying path 186. The fuser 152 fixes the developer image that has been transferred onto paper to the paper by means of heat and pressure. In the downstream side of the fuser 152 in the paper conveying path 186 is installed an introduction roller 154 for introducing the paper having undergone the image forming process into a post-processing device 20. The introduction roller 154 is disposed on a right side face 16A of the intra-body paper discharge section 16.

The paper supply section 18 comprises a plurality of paper receptacle cassettes 182 for receiving paper. To each paper receptacle cassette 182 is installed a sending-out mechanism for sending paper piece by piece out to the paper conveying path 186. The paper supply section 18 further comprises a pair of registration rollers 184 for adjusting timing to supply paper to the image forming section 14.

Figure 2:
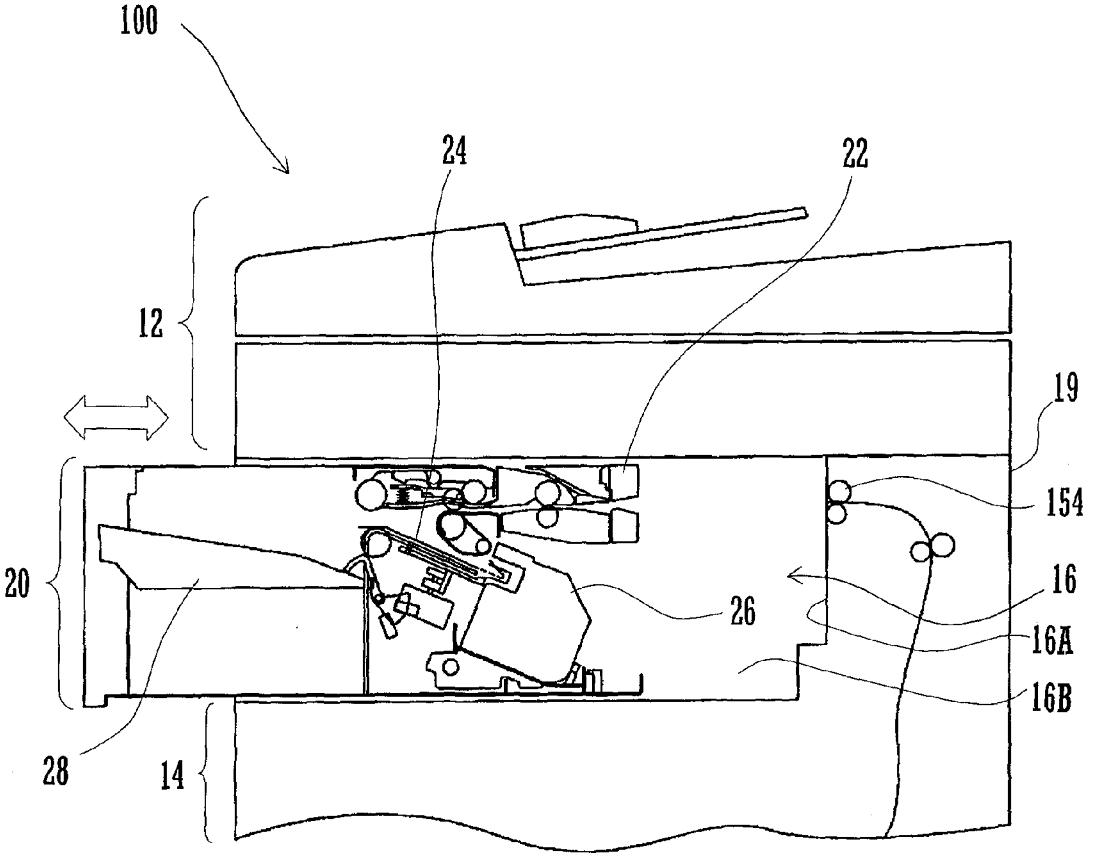
FIG. 2 is a schematic front sectional view of a post-processing device.

As shown in FIG. 2, the intra-body paper discharge section 16 is surrounded at the top face and the undersurface thereof by the image reading section 12 and the image forming section 14 respectively, and is surrounded at a rear face 16B and the right side face 16A thereof by part of the image forming section 14. Namely, the intra-body paper discharge section 16 is open only in the front face side and left side face side of the main body 19.

The post-processing device 20 is configured so as to be freely displaceable between the retracted position at which it is received inside the intra-body paper discharge section 16 and the protruded position at which it is drawn to the left side face side in relation to the main body 19. Depicted in FIG. 1 and FIG. 2 is a state of the post-processing device 20 that is drawn out from the main body 19. The post-processing device 20 in the retracted position performs a post-process on paper having undergone an image forming process.

The post-processing device 20 comprises a paper conveying section 22, a processing tray 24, a post-processing section 26 and a stacking tray 28. The paper conveying section 22 introduces paper that has been introduced into the post-processing device 20 by the introduction roller 154 to the processing tray 24. The paper conveying section 22 is joined to the paper conveying path 186 when in a state that the post-processing device 20 is disposed at the retracted position. The processing tray 24 is configured so as to contain temporarily a stack of paper to be handled by the post-processing section 26. The post-processing section 26 is configured so as to perform a binding process such as staple process and/or perforation process on paper that is placed on the processing tray 24. The stacking tray 28 is configured so as to contain paper that is discharged after having been post-processed by the post-processing section 26.

Figure 3:
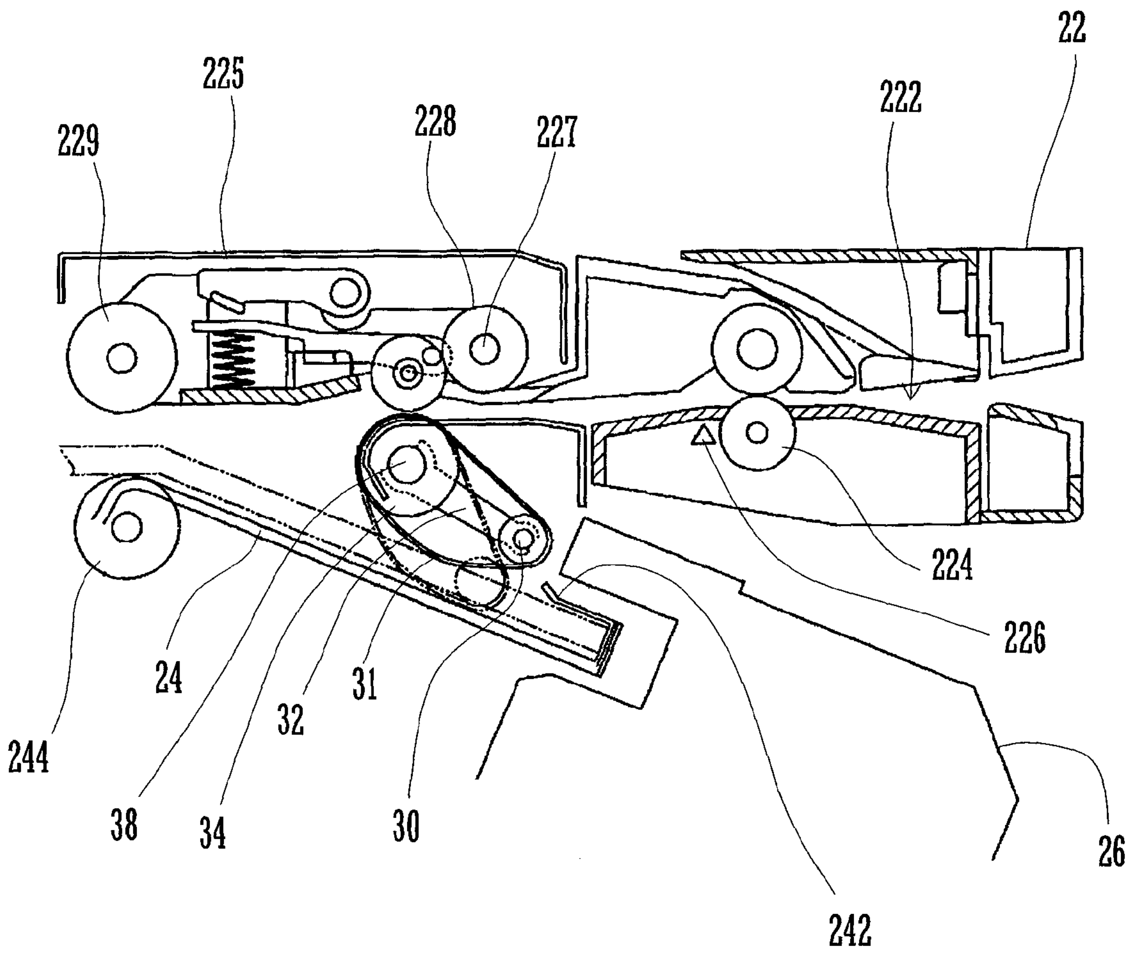
FIG. 3 is a front sectional view showing a paper conveying section, a processing tray, a post-processing section and a stacking tray.

As shown in FIG. 3, a conveyance route 222 is formed in the paper conveying section 22 so as to convey paper that has been sent from the image forming section 14 to a horizontal direction. Along the conveyance path 222, a pair of conveyance rollers 224 and another pair of conveyance rollers 34 are disposed. In the downstream side from the conveyance rollers 224 in the conveyance path 222 is installed a sensor 226 configured so as to detect the leading edge and rear end of the paper being conveyed. The conveyance rollers 34 are configured so as to discharge the paper to be post-processed to the processing tray 24.

In the downstream side from the conveyance rollers 34 in the conveyance path 222, a paper discharge roller 229 and another paper discharge roller 244 are installed. The paper discharge roller 229 is rotatably supported about a shaft at the end of a paper discharge mechanism 225 that is supported in such a manner as to be capable of swinging around a roller shaft 227 of the driving roller 228.

To the conveyance roller 34 is connected a support arm 32 that is capable of swinging around a rotating shaft 38 of the conveyance roller 34. At an end of the support arm 32, a pulley 30 is rotatably supported about a shaft. Across the support arm and the pulley 30, a caterpillar belt 31 is spanned. The caterpillar belt 31 guides paper on the processing tray 24 to a predetermined alignment position. To be concrete, the caterpillar belt 31 is configured so as to transmit conveyance power to paper, until an edge of the paper introduced into the processing tray 24 comes into contact with a positioning member 242. The positioning member 242 is configured so as to abut against the leading edge of the paper at the alignment position.

The processing tray 24 is configured so as to be slanted upward towards a discharge direction. The paper that has been introduced to the processing tray 24 is guided to a bottom edge side of the processing tray 24 by its own weight and the conveyance power of the caterpillar belt 31. Method for conveying paper on the processing tray 24 is not limited to such; so, it may be possible to include further conveyance roller(s) configured in such a manner as to guide the paper to the alignment position in collaboration with the caterpillar belt 31.

Figure 4:
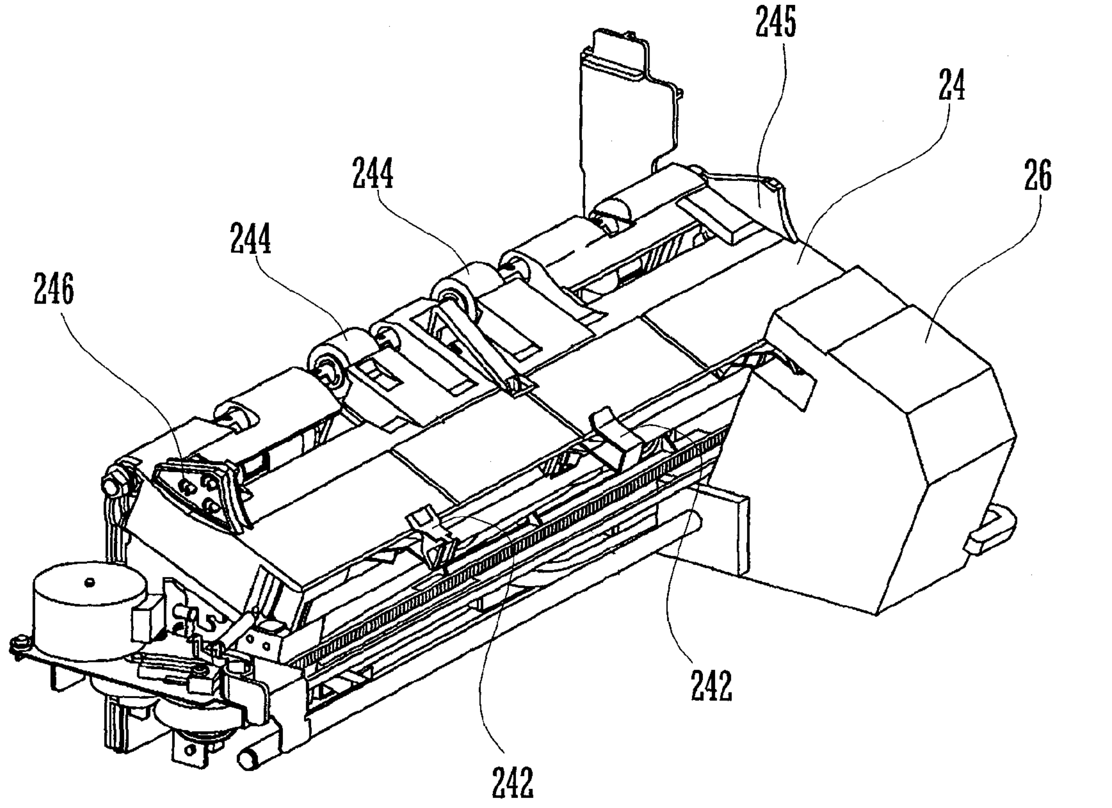
FIG. 4 is a perspective view of the processing tray.

As shown in FIG. 4, to the processing tray 24 are installed a first alignment board 245 and a second alignment board 246 that are supported moveably in widthwise direction (a direction perpendicular to the paper discharge direction) of the processing tray 24. The first alignment board 245 and second alignment board 246, by means of a rack and pinion mechanism installed inside of the processing tray 24 as well as a first actuator having a motor for supplying a driving force to the pinion gear, are configured so as to move in the widthwise direction of the processing tray 24. However, method for driving the first alignment board 245 and second alignment board 246 is not limited to what is described in this embodiment. Additionally, although the post-processing section 26 is configured so as to be moveable in the widthwise direction of the processing tray 24 in this embodiment, it is not an essential requirement but an optional requirement to move the post-processing section 26 in the widthwise direction of the processing tray 24 in implementing the present invention.

Figure 5:
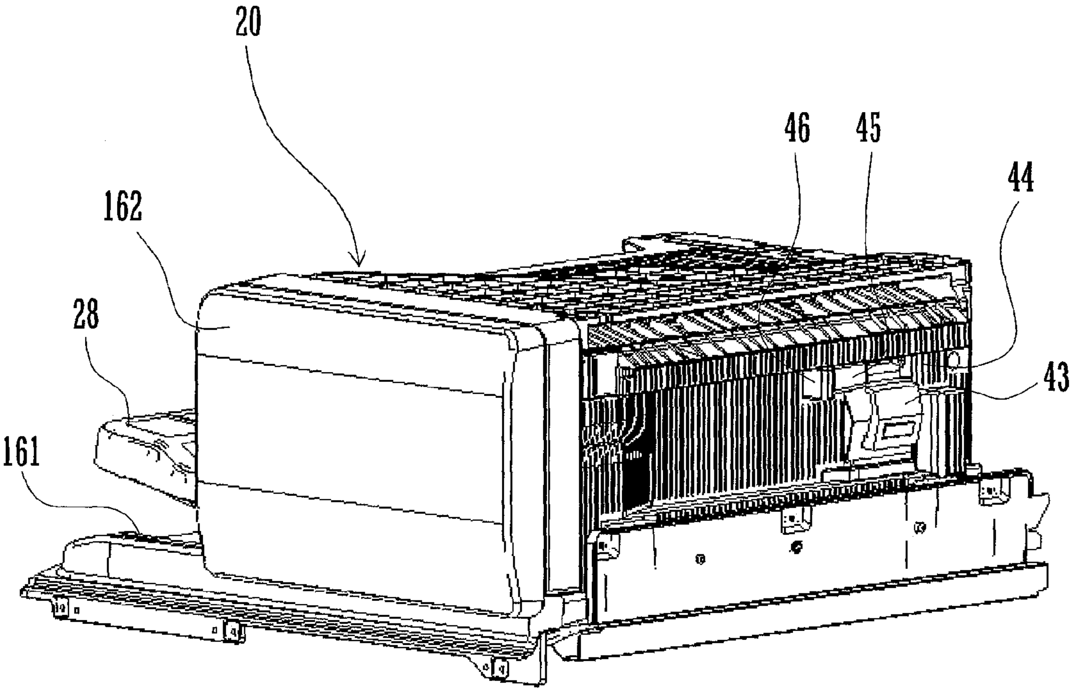
FIG. 5 is a perspective view of the post-processing device.
Figure 6:
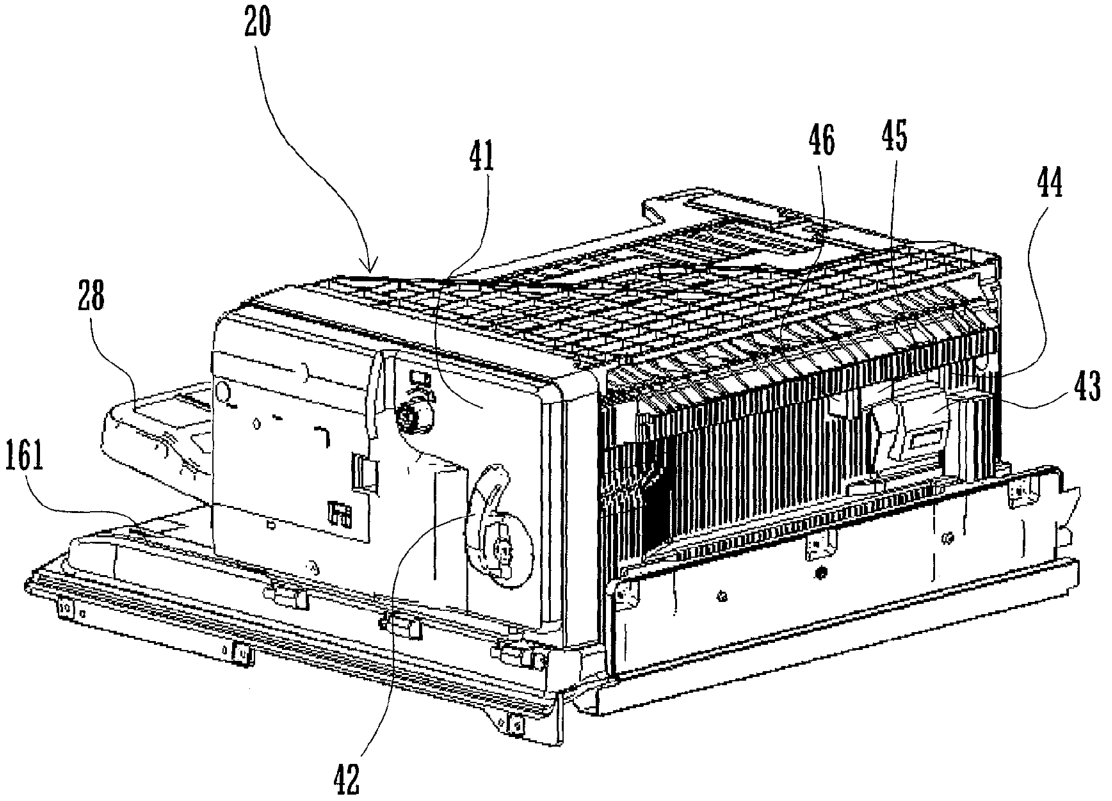
FIG. 6 is another perspective view of the post-processing device.
Figure 7:
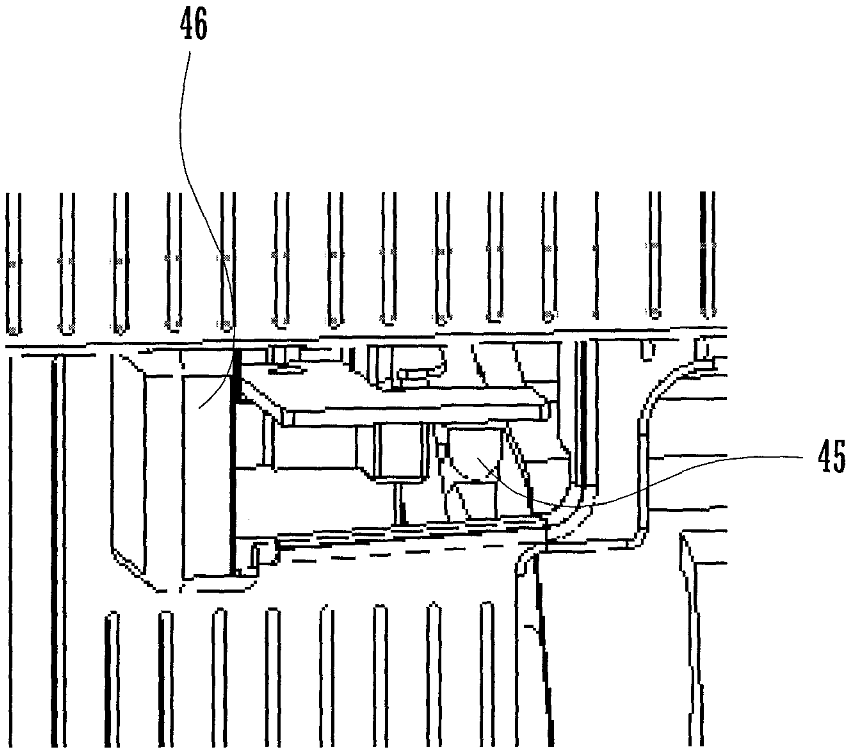
FIG. 7 is a perspective view showing a light source and a shade member.

As shown in FIG. 5 and FIG. 6, the post-processing device 20 is configured so as to be displaceable between a retracted position and a protruded position along a guide rail 161 installed at the undersurface of the intra-body paper discharge section 16. Further, to the intra-body paper discharge section 16 is installed a shutter member 162 configured so as to be capable of swinging freely between a closed position at which the front face 41 of the post-processing device 20 is covered and an open position at which the front face 41 is opened. The shutter member 162 is rotatably supported about a shaft by an edge section of the front face of the undersurface of the intra-body paper discharge section 16. Still, FIG. 5 shows a state in which the shutter member 162 is at closed position, whereas FIG. 6 shows another state in which the shutter member 162 is removed.

The post-processing device 20 comprises a locking lever 42 on the front face 41. Turning the locking lever 42 causes to lock or release the displacement between the retracted position and protruded position of the post-processing device 20.

The post-processing device 20 comprises a staple cartridge 43 on the upstream side face of the drawing direction, i.e. on a right side face 44. The staple cartridge 43 contains staples to be supplied to the post-processing section 26. The staple cartridge 43 is configured so as to be attachable to and detachable from the right side face 44 of the post-processing device 20. The staple cartridge 43 is an objective working section to which maintenance tasks such as refilling the staples, etc., are carried out on the regular or contingent basis.

The right side face 44 of the post-processing device 20 is contiguous to the main body 19 in order that the paper conveying section 22 is joined to the paper conveying path 186 at the retracted position. On the other hand, when the maintenance task is carried out, the post-processing device 20 is drawn to the protruded position so as to make a workspace between the right side face 44 and the main body 19.

As shown in FIG. 5-FIG. 8, the post-processing device 20 comprises a light source 45 on the right side face 44 and in the front face 41 side from the staple cartridge 43. As the light source 45, for example, a white LED (Light Emitting Diode) is used. The light source 45 has a function to light up the staple cartridge 43 at the protruded position. The light source 45 may be covered, for example, with a semitransparent cover member.

The post-processing device 20 further comprises a shade member 46 on the right side face 44 and in the front face 41 side from the light source 45.

The dimension in height of the shade member 46 is configured so as to be larger than that of the light source 45. In the height direction, the light source 45 is disposed between an upper end and a lower end of the shade member 46. In the height direction, it is preferred that the light source 45 is disposed at center of the shade member 46. The shade member 46 projects more than the light source 45 on the right side face 44. The shade member 46 blocks off direct projection light of the light source 45 to the front face 41 side.

When a maintenance task is carried out, for enabling the post-processing device 20 drawn to the protruded position, the locking lever 42 is turned so that locking of the post-processing device 20 is released, and thereby the light source 45 is illuminated. So when the post-processing device 20 is drawn to the protruded position, the staple cartridge 43 is lit up by the light source 45 in between the post-processing device 20 of the intra-body paper discharge section 16 and the main body 19.

Accordingly, brightness around the staple cartridge 43 increases, and thereby workability at the staple cartridge 43 improves. On the other hand, because the shade member 46 is disposed in the front face 41 side from the light source 45, direct projection light of the light source 45 to the front face 41 side is blocked. Therefore, visibility in the intra-body paper discharge section 16 improves when the intra-body paper discharge section 16 is lit up with the light source 45, thereby workability improves, and direct projection light of the light source 45 is prevented from coming into a user's sight. Since the direct projection light won't come into the user's sight, the user won't be dazzled, and thus hindrance to workability is eliminated.

Additionally, by using a light emitting diode (LED) as the light source 45, it is achievable to light up the intra-body paper discharge section 16 with a low power. Further, by using a white LED as the light source 45, a user's visibility in the intra-body paper discharge section 16 further increases, and thereby workability improves even more. Moreover, by installing a semitransparent cover member covering the light source 45, it is enabled to further moderate the light emitted from the light source 45.

Further still, when the objective working section that is the object to be lit up with the light source 45 is the staple cartridge 43, the area needed to light up with the light source 45 may be narrower as compared to when paper is lit up. Therefore, it is possible to reduce light quantity of the light source 45, and then direct projection light to the front face 41 side is blocked by the shade member 46 more securely.

Figure 8:
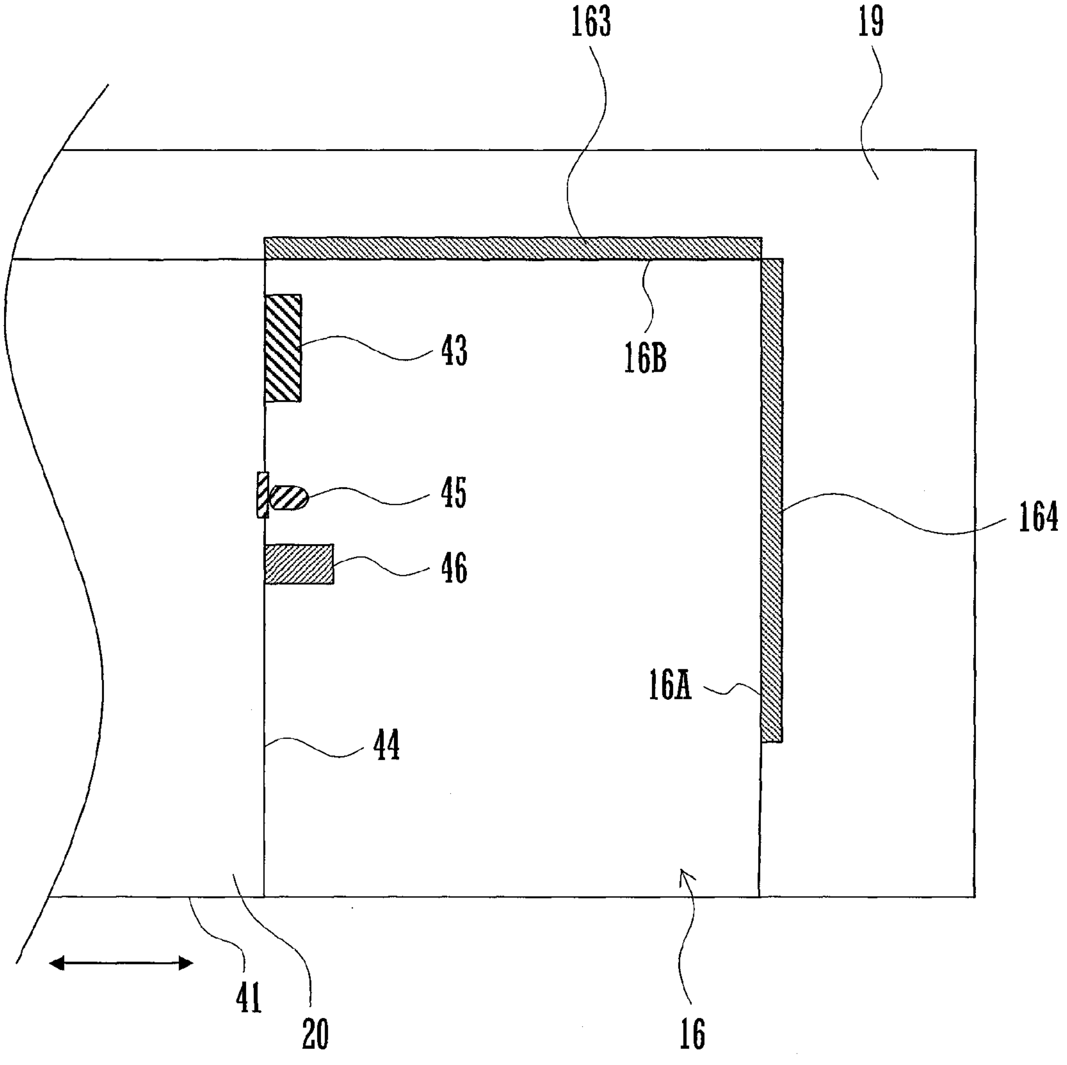
FIG. 8 is a plane sectional view showing part of an outline configuration of the image forming apparatus.

As shown in FIG. 8, the image forming apparatus 100 comprises, in at least part of the inner face of the intra-body paper discharge section 16, a reflective member 163, 164 for reflecting the light emitted from the light source 45. In this embodiment, the image forming apparatus 100 comprises a reflective member 163 disposed on the rear face 16B of the intra-body paper discharge section 16, and a reflective member 164 disposed on the right side face 16A of the intra-body paper discharge section 16. Since the intra-body paper discharge section 16 becomes brighter by the reflected light from the reflective members 163, 164, workability of maintenance tasks at the intra-body paper discharge section 16 improves. Besides, the reflective members 163, 164 may be configured using white members. By configuring the reflective members 163, 164 using white members, reflectivity of the reflective members 163, 164 rises, so that workability improves even more.

Figure 9:
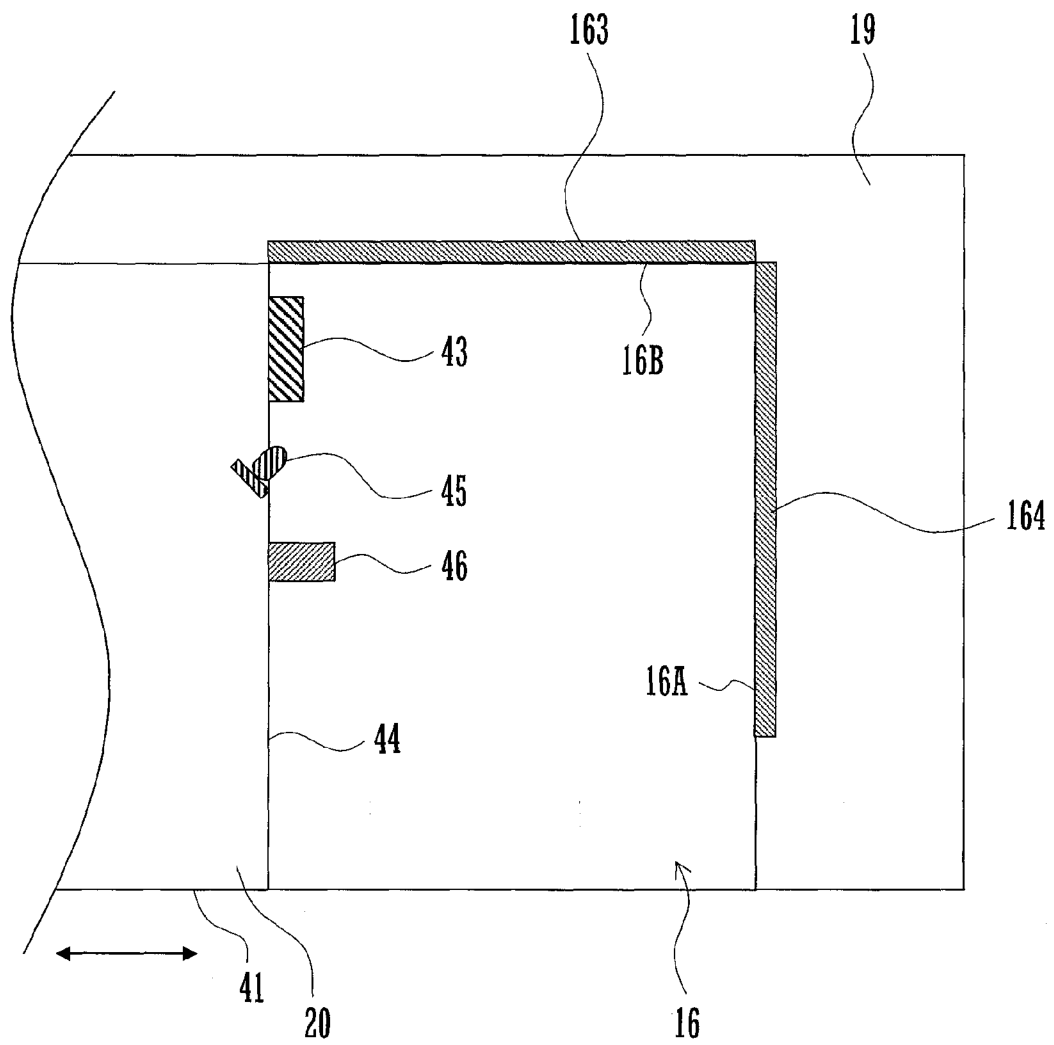
FIG. 9 is a plane sectional view showing part of an outline configuration of the image forming apparatus according to another embodiment.

As shown in FIG. 9, the light source 45 may be disposed toward the rear face 47 side. Since the light source 45 is directed toward the rear face 47 side, light quantity of the direct projection light emitted from the light source 45 to the front face 41 side decreases. Accordingly, while far back of the intra-body paper discharge section 16 is lighted up a with greater light quantity, direct projection light to the front face 41 side is blocked by the shade member 46 more securely.

A control section 190 controls the lighting condition of the light source 45 depending on details of a maintenance task needed for the staple cartridge 43.

As an example, the control section 190 causes to flash the light source 45 when jamming of staple occurs, whereas it causes to turn on the light source 45 when the staple cartridge 43 runs short of staple. As a maintenance task, when jamming of staple occurs, the staple is removed; and when the staple cartridge 43 runs short of staple, staples are supplied thereto.

As another example, the control section 190 causes to turn on the light source 45 under a normally set state that the staple cartridge 43 is attached to the post-processing device 20 in a predetermined condition. On the other hand, the control section 190 causes to flash the light source 45 in the event where the staple cartridge 43 is not attached to the post-processing device 20 in the normally set state, such as when the staple cartridge 43 is set in a BAD status; that is, although it is inserted to the post-processing device 20, it is not attached in the predetermined condition.

By varying the mode of lighting of the light source 45 depending on the details of a maintenance task needed for the staple cartridge 43, the user can be informed of details of the maintenance task needed in a simple and secure manner. Besides, since the user is informed of details of the maintenance task in the vicinity of the staple cartridge 43, he or she can know easily the details of the maintenance task needed without moving a glance.

Still, with the post-processing device 20 equipped with a plurality of light sources 45, it is also possible to display the details of the maintenance task needed for the staple cartridge 43 by means of the plurality of light sources 45. For instance, it is possible to indicate, with the first light source, of solving the jamming of staples or refilling thereof as above described, and to indicate, with the second light source, of mounting condition of the staple cartridge 43 as above mentioned.

Moreover, the light source 45 may not be limited to be disposed in the front face 41 side from the objective working section for the maintenance tasks, but may be provided at a position from which it can light up the objective working section. However, it is an essential requirement that the shade member 46 be disposed in the front face 41 side of the light source 45; and it is preferred that the shade member 46 is disposed adjacent to the light source 45. With the shade member 46 disposed adjacent to the light source 45, direct projection light of the light source 45 to the front face 41 side is blocked more securely by the shade member 46.

Further, the objective working section for the maintenance tasks is not limited to the staple cartridge 43; it may be a punch for carrying out the perforation. In this case, tasks such as replacing the punch and/or solving the jamming of perforated wastepaper, etc. may be cited as the maintenance tasks.

Moreover, the objective working section for the maintenance tasks may be the paper conveying section 22. In this case, a task of removing the paper which caused failure in conveyance in the paper conveying section 22 may be cited as the maintenance task.

Further, the post-processing device 20 is not limited to the one performing the binding process, and may be configured as a transit conveying device.

Besides, the light source 45 is not limited to LED; and a fluorescent lamp, incandescent lamp or the like may be used as the light source 45.

Further still, being provided with the reflection members 163, 164 is not an essential requirement, but an optional requirement.

Also, even when the intra-body paper discharge section 16 is configured so as to be open to the rear face side as well as front face side and left side face side of the main body 19, it is enabled, by lighting up the objective working section with the light source 45, to achieve effects such that workability at the intra-body paper discharge section 16 improves, and that direct projection light of the light source 45 is prevented from coming into a user's sight. This is due to the fact that the image forming apparatus 100 is most often disposed so that its rear face goes along a wall surface of a building, so that the intra-body paper discharge section 16 is substantially not open to the rear face side, and hence that it barely occurs that light comes from the rear face side to the intra-body paper discharge section 16.

The above explanation of the embodiment is nothing more than illustrative in any respect, nor should be thought of as restrictive. Scope of the present invention is indicated by claims rather than the above embodiments. Further, it is intended that all changes that are equivalent to a claim in the sense and realm of the doctrine of equivalence be included within the scope of the present invention.

What is claimed is:

1. An image forming apparatus comprising:

a main body including an intra-body paper discharge section, the intra-body paper discharge section being provided in a space sandwiched between upside and downside respectively, by an image reading section for reading an image of a document and generating a set of image data, and an image forming section for performing an image forming process on a recording medium based on the set of image data; the intra-body paper discharge section being whereto the recording medium that has undergone the image forming process is discharged;

a post-processing device disposed so as to be freely displaceable between a retracted position at which it is received by the intra-body paper discharge section and a protruded position at which it is drawn to one side face side; the post-processing device, at the retracted position, being adapted for performing a process on the recording medium that has undergone the image forming process;

an objective working section disposed on an upstream side face of the post-processing device in the drawing direction of the post-processing device, the objective working section being whereto a maintenance task is carried out at the protruded position;

a light source disposed on the upstream side face and having a function to light up the objective working section at the protruded position; and a shade member disposed on the upstream side face and in the front face side from the light source for blocking off direct projection light to the front face side of the light source, wherein a dimension in height of the shade member is configured so as to be larger than a dimension in height of the light source, and the shade member projects more than the light source on the upstream side face.

2. The image forming apparatus as claimed in claim 1, wherein the light source is disposed toward a rear face side on the upstream side face and in the front face side from the objective working section.

3. The image forming apparatus as claimed in claim 1, wherein the light source is a white LED.

4. The image forming apparatus as claimed in claim 1, wherein a reflection member for reflecting light emitted from the light source is disposed on at least part of an inner face of the intra-body paper discharge section.

5. The image forming apparatus as claimed in claim 4, wherein the reflection member is configured with a white member.

6. The image forming apparatus as claimed in claim 1, the apparatus further comprising a control section for controlling lighting conditions of the light source depending on the details of the maintenance task needed for the objective working section.

7. The image forming apparatus as claimed in claim 1, wherein the objective working section is a staple cartridge for containing staples to bind the recording media.

* * * * *